(12) United States Patent
Hanover et al.

(10) Patent No.: US 11,006,043 B1
(45) Date of Patent: May 11, 2021

(54) IMAGE-CAPTURE CONTROL

(71) Applicant: Snap Inc., Santa Monica, CA (US)

(72) Inventors: Matthew Hanover, Los Angeles, CA (US); Justin Huang, Los Angeles, CA (US); David Meisenholder, Manhattan Beach, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/374,718

(22) Filed: Apr. 3, 2019

Related U.S. Application Data

(60) Provisional application No. 62/651,871, filed on Apr. 3, 2018.

(51) Int. Cl.
| | | |
|---|---|---|
| *H04N 5/232* | (2006.01) | |
| *H04N 5/225* | (2006.01) | |
| *H04N 5/247* | (2006.01) | |
| *G08B 5/36* | (2006.01) | |

(52) U.S. Cl.
CPC ....... *H04N 5/23245* (2013.01); *H04N 5/2252* (2013.01); *H04N 5/2253* (2013.01); *H04N 5/247* (2013.01); *G08B 5/36* (2013.01)

(58) Field of Classification Search
None
See application file for complete search history.

(56) References Cited

U.S. PATENT DOCUMENTS

| | | | |
|---|---|---|---|
| 9,554,036 B1* | 1/2017 | Lin .................. | H04N 5/23222 |
| 2004/0027467 A1* | 2/2004 | Shiga .................. | H04N 5/2252 |
| | | | 348/231.99 |
| 2004/0203608 A1* | 10/2004 | Osann, Jr. .......... | H04L 12/2854 |
| | | | 455/412.1 |
| 2015/0009309 A1* | 1/2015 | Heinrich .............. | G02B 27/017 |
| | | | 348/61 |
| 2017/0227162 A1* | 8/2017 | Saika .................. | G03B 17/561 |
| 2019/0268668 A1* | 8/2019 | Moskovchenko ........................ | |
| | | | H04N 21/4788 |
| 2019/0286253 A1* | 9/2019 | Kwon ................. | G06F 3/04817 |

\* cited by examiner

*Primary Examiner* — James M Hannett
(74) *Attorney, Agent, or Firm* — Schwegman Lundberg & Woessner, P.A.

(57) ABSTRACT

In a camera-enabled electronic device, photo capture is triggered by a press-and-hold input only if the holding duration of the press-and-hold input is greater than a predefined threshold duration. A press-and-hold input shorter in duration than the threshold triggers video capture. Thus, a short press triggers video capture, while a long press triggers photo capture.

10 Claims, 7 Drawing Sheets

IMAGE-CAPTURE CONTROL

PRIORITY

This application claims the benefit of priority to U.S. Provisional Patent Application Ser. No. 62/651,871, filed on Apr. 3, 2018, the benefit of priority which is claimed hereby, and which is incorporated by reference herein in its entirety.

BACKGROUND

Many camera-enabled electronic devices, particularly wearable devices such as electronics-enabled eyewear devices, often have limited available space and/or capacity for input mechanisms to control camera operation. Provision of a single common input mechanism for allowing intuitive user-selection of either photo capture or video capture has proven problematic.

These difficulties are exacerbated in applications where image-capture components (such as an image sensor microchip and/or an image processing microchip) are sometimes initially in a dormant state, and are to boot up before being able to capture and/or process image data.

BRIEF DESCRIPTION OF THE DRAWINGS

The appended drawings illustrate example embodiments of the present disclosure, and it is to be noted that these are merely example embodiments that are not to be considered as limiting the scope of the disclosure. In the drawings.

DESCRIPTION

Figure 1:
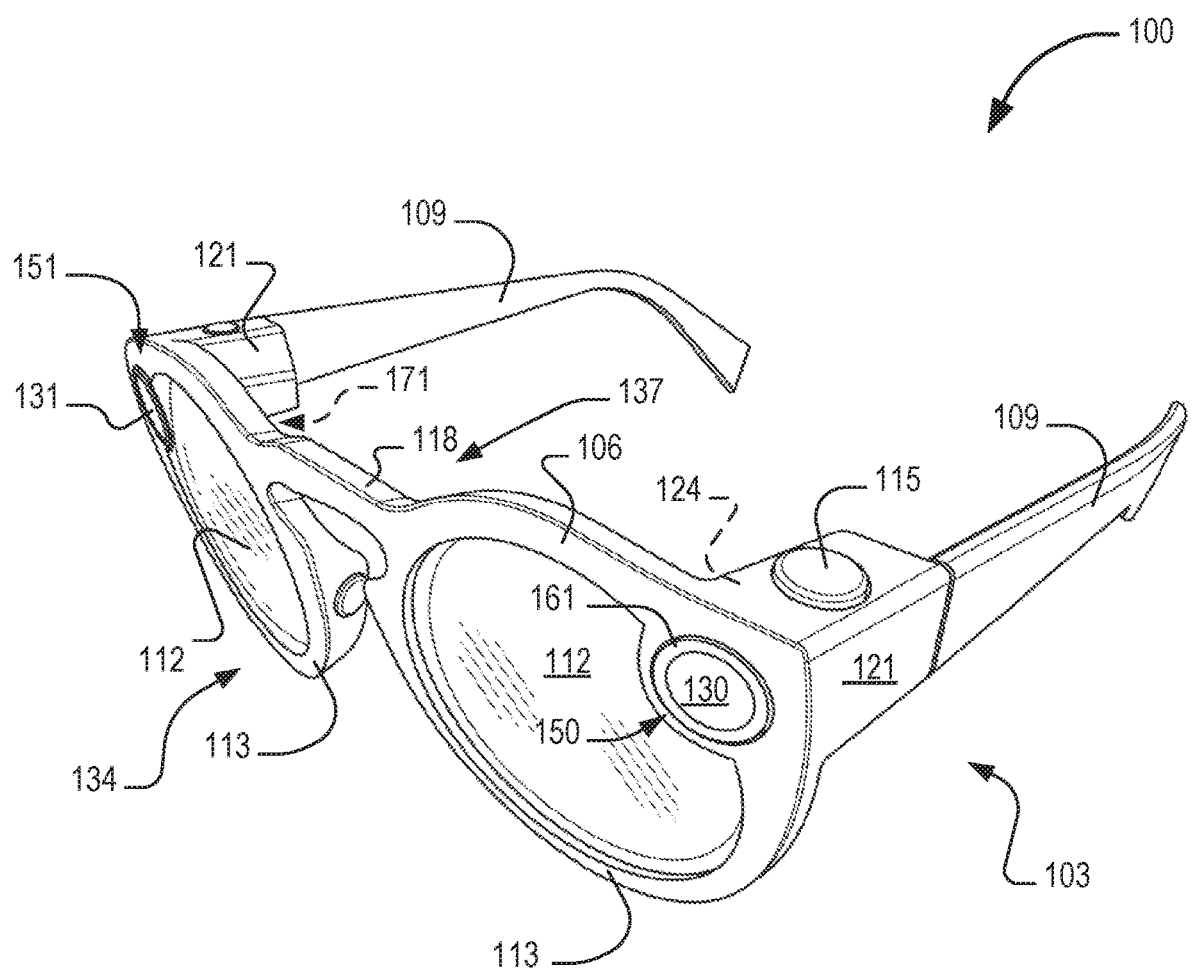
FIG. 1 is a schematic of a three-dimensional view of an electronics-enabled device in the form of a pair of smart glasses having one or more functionalities operable by use of a single-action button mechanism incorporated in the device, according to an example embodiment.

One aspect of the disclosure provides for a camera-enabled electronic device in which photo capture is triggered by a press-and-hold input only if the holding duration of the press-and-hold input is greater than a predefined threshold duration. In some embodiments, a press-and-hold input shorter than the threshold duration triggers video capture. Thus, a short press in such embodiments triggers video capture, while a long press triggers photo capture. In this context, short presses and long presses are distinguished by whether or not the length of the press exceeds the threshold duration.

In some embodiments, the device is an electronics-enabled eyewear device, with the press-and-hold input being provided via a binary haptic input mechanism. With binary input mechanism is meant that the mechanism is disposable to only one of two states, thus being switchable between these two states exclusively. In such embodiments, the input mechanism may be disposable between an engaged condition and a disengaged condition (e.g., between a pressed and a released condition). Such input mechanisms are also referred to as single-action input mechanisms.

In this manner, timing of visual media capturing by the camera is determined not by when the button is pressed, but by when it is released. A benefit of such release-triggered initiation of visual media capture, combined with photo capture being triggered by a long press, is that it allows for initially dormant image-capture components (e.g., a camera controller, an image processing chip, an image sensor chip, or the like) to boot up during the button press, limiting lag between button release and photo capture. It will be appreciated that lag or delay between button release and video capture will typically in such instances be longer than the lag or delay between button release and photo capture. This arrangement is based on the insight that subjective user experience is more likely to be adversely affected by lag between a user input trigger and photo capture than is the case with video capture, considering that the timing of photo capture tends to be more time-sensitive than the timing of capturing of a video clip.

The threshold duration may in some embodiments be shorter than one second, in a particular embodiment being about 600 ms. The device may be configured to provide a visual indication of whether the device is in a video capture mode (e.g., during the press-and-hold input but before reaching the threshold duration) or whether the device is in a photo capture mode (e.g., during the press-and-hold input but after reaching the threshold duration). In some embodiments, the visual indication is provided by one or more indicator lights (e.g., indicator LEDs) facing towards the user when the device is worn.

The device may further be configured to provide a visual indication to the user when the photo is captured. In some embodiments, such a photo capture indication may be a photo capture flash produced by the same indicator lights that are used for providing the device mode indication. In some such embodiments, the photo capture flash is produced at a higher intensity than the device mode indication.

Other aspects of the disclosure include an eyewear device that incorporates the disclosed techniques, a method that implements the disclosed techniques, and a computer readable storage medium having stored thereon instructions for causing a machine executing the instructions to perform operations according to the disclosed techniques.

DETAILED DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

FIG. 1 shows an oblique front view of a camera-enabled electronic device in the example form of an electronics-enabled eyewear device 100 (also known as a pair of smart glasses) that provides for single-action button-operated user control of camera operation, according to one example embodiment. The eyewear device 100 includes a body 103 comprising a front piece or frame 106 and a pair of temples 109 hingedly connected to the frame 106 for supporting the frame 106 in position on a user's face when the temples 109 are in an extended or wearable configuration, as shown in FIG. 1. The frame 106 is in this example embodiment at least partially provided by one or more substantially rigid molded components formed of a polymeric plastics material.

The eyewear device 100 has a pair of optical elements in the form of a pair of lenses 112 held by corresponding optical element holders in the form of a pair of lens rims 113 forming part of the frame 106. The rims 113 are connected by a bridge 118. In other embodiments, one or both of the optical elements can be a display, a display assembly, or a lens and display combination. The eyewear device 100 can, in such embodiments, provide a virtual reality headset or an augmented reality display.

The frame 106 includes a pair of end pieces 121 defining lateral end portions of the frame 106. In this example, a variety of electronics components are housed in one or both of the end pieces 121, as discussed in more detail below. In some embodiments, the frame 106 is formed of a single piece of material, so as to have a unitary or monolithic construction. In this example embodiment, each end piece 121 is formed by a separate molded plastics component.

The temples 109 are hingedly coupled to the respective end pieces 121 by respective hinge mechanisms so as to be hingedly movable between a wearable mode (as shown in FIG. 1) and a collapsed mode in which the temples 109 are pivoted towards the frame 106 to lie substantially flat against it.

In this description, directional terms such as front, back, forwards, rearwards, inwards, and outwards are to be understood with reference to a direction of view of a user when the eyewear device 100 is worn. Thus, the frame 106 has a front side 134 facing outwardly away from the user when worn, and an opposite rear side 137 facing inwardly towards the user when the eyewear device 100 is worn. Similarly, the terms horizontal and vertical as used in this description with reference to different features of the eyewear device 100 are to be understood as corresponding to the orientation of the eyewear device 100 when it is level on the face of a user looking forwards.

The eyewear device 100 has onboard electronics 124 including a computing device, such as a computer, which can, in different embodiments, be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. The onboard electronics 124 includes one or more processors with memory, wireless communication circuitry, and a power source (in this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124.

The eyewear device 100 is camera-enabled, in this example comprising a camera 130 mounted in one of the end pieces 121 and facing forwards so as to be aligned more or less with the direction of view of a wearer of the eyewear device 100. The camera 130 is mounted in a camera housing 150 incorporated in the corresponding end piece 121. In this example embodiment, the camera housing 150 (or, in some embodiments, a camera analog formation such as a light sensor housing 151, as discussed below) provides an external mode indicator 161 comprising a ring of LEDs arranged circumferentially about a lens opening defined by the camera housing 150. The external mode indicator 161 is configured to provide externally visible visual indication of the mode of operation of the camera 130. For example, when a video is actually being captured by the camera 130, a rotating animation is produced by the ring of LEDs 161. The camera 130 is configured to capture digital photo content as well as digital video content.

In some embodiments, the eyewear device 100 can have a pair of cameras 130, e.g. housed by the respective end pieces 121. In this example embodiment, however, a camera analog formation (i.e., being a formation that has the external appearance of a camera housing) on the opposite lateral side of the frame 106 provides a light sensor housing 151 in which is mounted an ambient light sensor 131. Note that the light sensor housing 151 is directed forwards in essentially the same direction as the camera 130, and thus measures the intensity of light to which the camera 130 is exposed and which a wearer of the eyewear device 100 experiences, in use.

Figure 5:
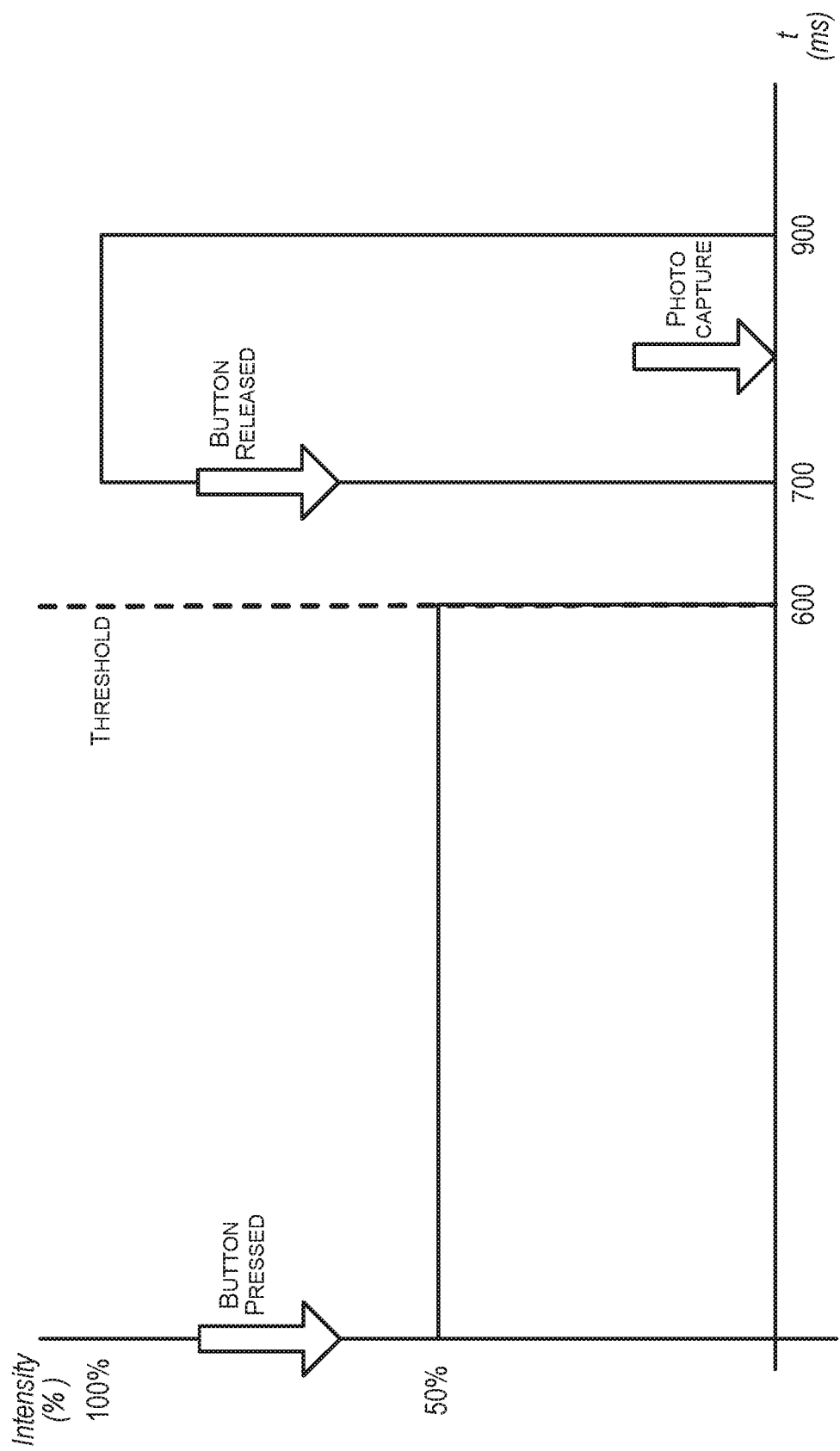
FIG. 5 is a timing diagram illustrating operation of an internal mode indication mechanism during performance of the example method of FIG. 4, according to an example embodiment.

In addition to the external mode indicator 161, the eyewear device 100 further includes an internal indicator 171 to indicate to a wearer occurrence of one or more operational modes or events. In this embodiment, the internal indicator 171 comprises an LED arrangement including at least one indicator light mounted on the inner surface 137 of the frame 106 to be peripherally visible to the wearer when lit. As will be described in greater detail below, particularly with reference to the timing diagram of FIG. 5, the internal indicator 171 is in this example embodiment activated during button press while button release will trigger a video capture (i.e., while the eyewear device 100 is in a video capture mode prior to actual capture), and is deactivated during button press while button release will trigger a photo capture (i.e., while the eyewear device 100 is in a photo capture mode prior to actual capture). In addition, the internal indicator 171 provides a photo capture indication comprising a flash synchronized with photo capture. The indicator light, or another component of the internal indicator 171, may yet further be continuously activated during video capture. In this manner, the wearer is apprised of the current operational mode of the eyewear device 100, and is also informed of the timing of photo capture. It will be appreciated that such a user-oriented internal indicator 171 is to be distinguished from the external mode indicator 161 in that the external mode indicator 161 is sized and positioned specifically to alert persons other than the user of video and/or photo capture and is not visible to the wearer during of the eyewear device 100. The internal indicator 171, in contrast, is typically not visible to anyone other than the wearer.

The eyewear device 100 further includes one or more input and output devices permitting communication with the eyewear device 100. In particular, the eyewear device 100 includes an input mechanism for enabling user control of one or more functions of the eyewear device 100. In this embodiment, the input mechanism comprises a button mechanism that includes a button 115 mounted on the frame 106 so as to be accessible on top of one of the end pieces 121 for pressing by the user. In this example embodiment, the button 115 provides the only input mechanism for controlling operation of the camera 130.

Figure 2:
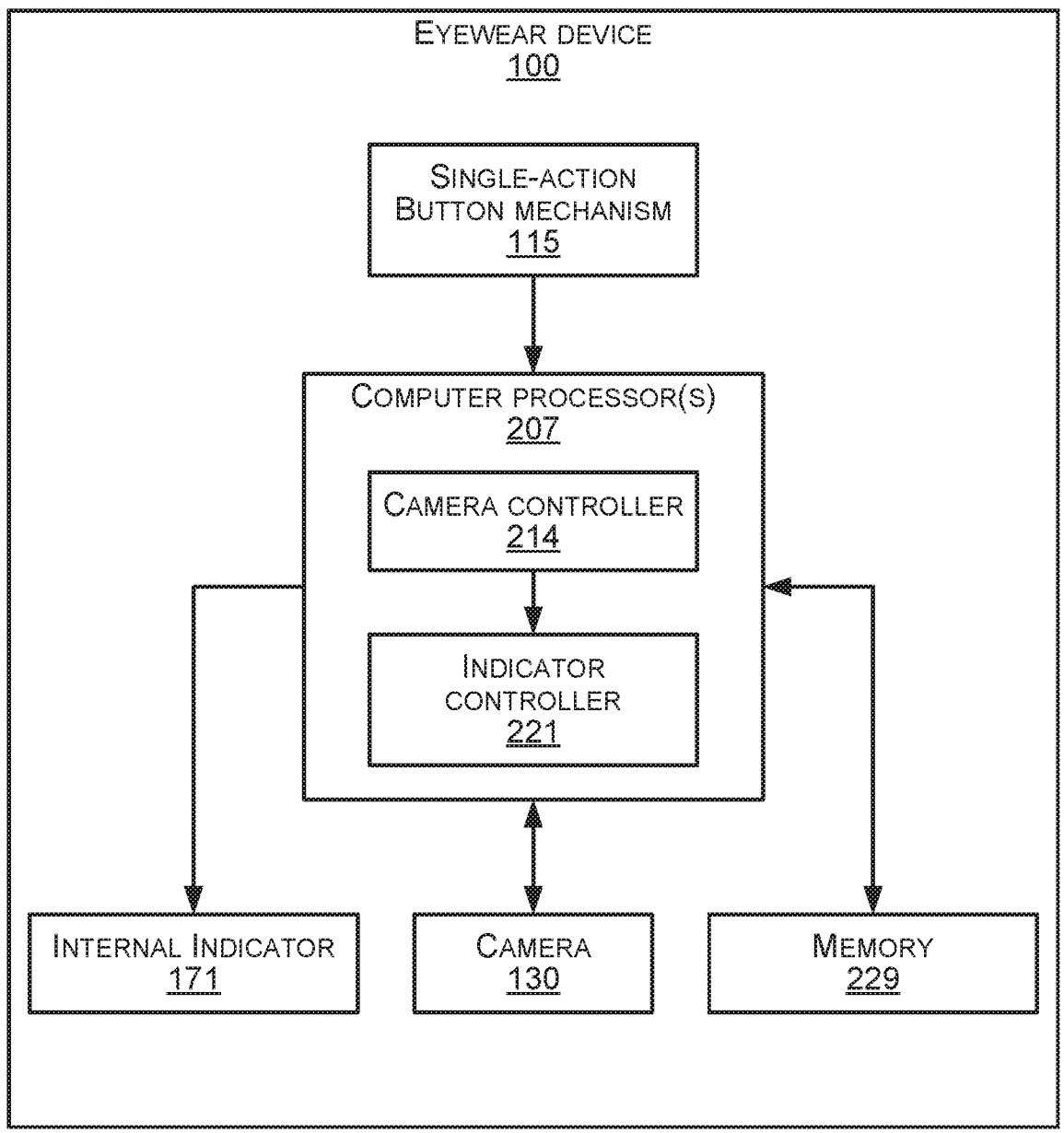
FIG. 2 is a schematic view of an eyewear device according to an example embodiment.

Turning now to FIG. 2, therein is shown a schematic diagram of the eyewear device 100 according to the example embodiment described with reference to FIG. 1. The diagram of FIG. 2 shows selected components involved with the provision of the disclosed techniques. It will be appreciated that the eyewear device 100 includes various additional components that provide other functionalities, and that are omitted for brevity of description. Note that a corresponding arrangement of machine components may apply to embodiments in which an electronic device consistent with the disclosure comprises, for example, a mobile electronic device such as a smartphone, a tablet, or a digital camera.

As shown in the diagram of FIG. 2, the eyewear device 100 includes a computer processor(s) 207 that provides a central controller for controlling electronic functionalities of the eyewear device 100. The computer processor(s) 207 forms part of the onboard electronics 124 incorporated in the frame 106 of the eyewear device 100 (see FIG. 1). The computer processor(s) 207 in this example thus forms part of an onboard computing device and comprises circuitry configured to control automated operations of various components of the eyewear device 100, including the previously described onboard camera 130, the external mode indicator 161, and the internal indicator 171. These functionalities are represented in FIG. 2 by a camera controller 214 and an indicator controller 221 configured to control operation of the camera 130 and the internal indicator 171, respectively. In some embodiments, the circuitry of the camera controller 214 and/or the indicator controller 221 is provided by permanently configured circuitry (e.g., in the form of an application-specific integrated circuit). In a particular example embodiment, at least part of the camera controller 214 is provided by an image processing microchip. In other embodiments, the circuitry of the camera controller 214 and/or the indicator controller 221 comprises dynamically reconfigurable circuitry provided by a processor executing machine-readable instructions for performing the various automated operations. Thus, during execution of particular instructions, the processor provides circuitry configured to perform corresponding operations. The eyewear device 100 further includes one or more memories 229 communicatively coupled to the computer processor(s) 207. The memory 229 is used for storing image data representative of visual media content (i.e., photo or video content) captured by the camera 130. In addition, the memory 229 can in some embodiments store instructions for execution by the computer processor(s) 207 to instantiate the camera controller 214 and/or the indicator controller 221.

As described previously, the eyewear device 100 includes a single action button mechanism 115 (also referred to herein for consistency of description simply as the button 115) that is communicatively coupled to the camera controller 214 to communicate user commands received by the button 115, e.g. to trigger video capture or photo capture. The camera controller 214 is in turn connected to the camera 130 to control camera operation responsive to reception of such commands.

Figure 3:
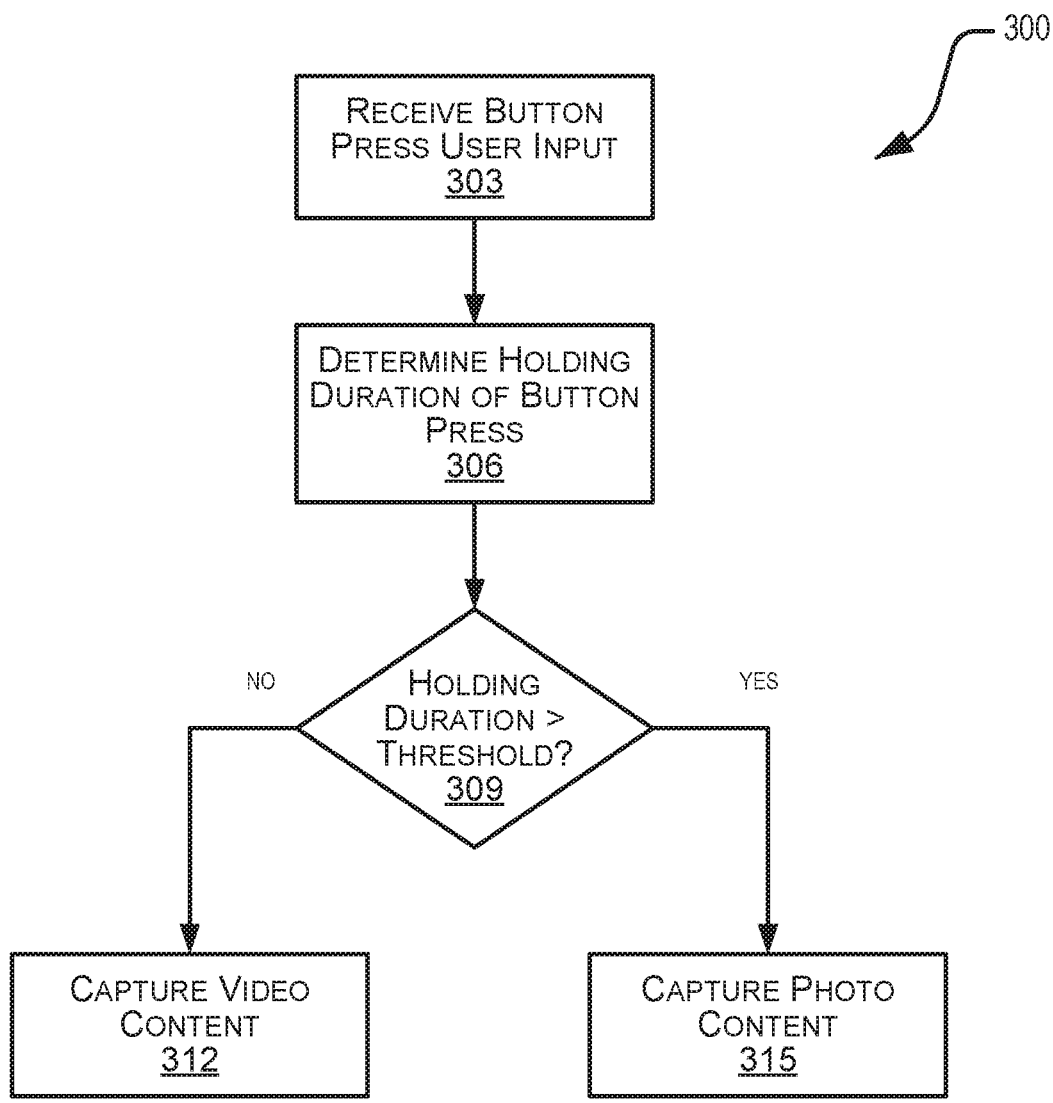
FIG. 3 is a high-level flowchart of a method of operating a camera-enabled eyewear device, according to an example embodiment.

FIG. 3 shows a high-level flowchart 300 of an example method of operating a camera-enabled electronic device according to an example embodiment. In this embodiment, the flowchart 300 illustrates operations performed by computer processor(s) 207 of the example eyewear device 100 of FIGS. 1 and 2.

At operation 303, a button press user input is received, the user input consisting of depression and release of the button 115 by the user. At operation 306, the camera controller 214 determines a holding duration of the button press. The holding duration is defined as the time interval between initial depression of the button 115 and release of the button 115.

At operation 309, it is determined whether or not the holding duration of the button press input exceeds a predefined threshold duration. In this example embodiment, the threshold duration is 600 ms. If the button press duration is shorter than the threshold duration (i.e., in this example being 600 ms or shorter), then the camera controller 214 causes the camera 130 to capture video content, at operation 312. If, however, it is determined at operation 309 that the button press duration is longer than the threshold duration (i.e., in this example being longer than 600 ms), then the camera controller 214 causes the camera 130 to capture photo content, at operation 315.

It will be seen that a short button press (defined in this instance as having a holding duration shorter than 600 ms) triggers video capture, while a long button press (defined in this instance as a press-and-hold button input that is held for longer than 600 ms) automatically triggers photo capture.

Figure 4:
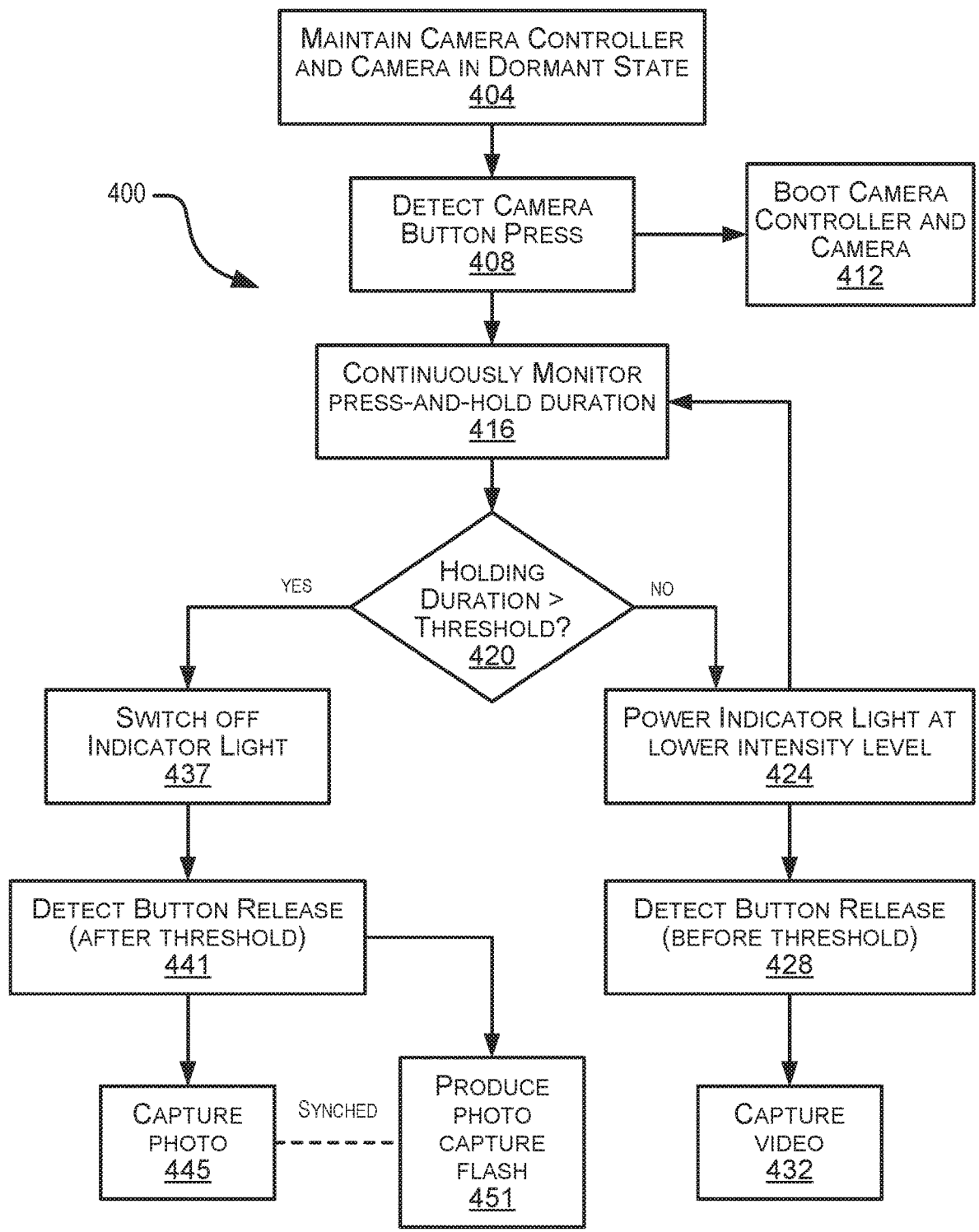
FIG. 4 is a more detailed flowchart of a method of operating a camera-enabled eyewear device, according to an example embodiment.

FIG. 4 shows a more detailed flowchart 400 of an example method of operating a camera-enabled electronic device according to another example embodiment. The flowchart 400 again illustrates operations performed by the computer processor(s) 207 of the example eyewear device 100 of FIGS. 1 and 2. The method 400 of FIG. 4 will further be described at the hand of the timing diagram of FIG. 5.

Initially, at operation 404, components of the eyewear device 100 providing camera-related functionalities are maintained in a dormant state. In particular, an image processing microchip and an image sensor microchip provided by the camera controller 214 and/or the camera 130 is maintained in a dormant state. Note that this is during worn use of the eyewear device 100, in which the eyewear device 100 is in an always-on state. To avoid the necessity of a two-phase procedure for initiating visual media capture (e.g., first switching on the device 100 and then pressing the button 115 to trigger image-capture), the eyewear device 100 is in other words not explicitly switched off or on by the user. For this reason, the eyewear device 100 in this example embodiment has no power on/off button or switch, and thus functions in an always-on state (at least for as long as the onboard battery provides sufficient power). To conserve battery power while no image-capture is taking place, the mentioned components relating to image-capture is powered down and maintained in the dormant state by default. As a result, however, the image processing chip and the image sensor chip has to boot up before being able to capture and process image data, which typically takes somewhere between 500 ms and one second between initial button press and camera operation.

At operation 408, pressing of the button 115 is detected. This corresponds with t=0 in the timing diagram of FIG. 5.

Responsive to detection of the button press, booting up of the camera controller 214 and camera 130 is started, at operation 412.

Thereafter, the camera controller 214 continuously monitors, at operation 416, the ongoing duration of the press-and-hold user input received via the button 115. At operation 420, the camera controller 214 on a continuous live basis monitors whether or not the holding duration exceeds the predefined threshold duration (in this example embodiment again being 600 ms).

While the duration of the button press is shorter than the threshold (represented by the sequence of operations branching off the right-hand side of operation 420 in the flowchart 400), the camera is in a video capture mode. While the button 115 is depressed and the device 100 is in the video mode, the internal indicator 171 is illuminated at a submaximal intensity level, at operation 424. As depicted schematically in FIG. 5, the intensity level of the video mode indication by the internal indicator 171 is in this example embodiment 50% of a maximum intensity level. Note that the maximum intensity level (and hence the specific intensity of the 50% level) is in this example embodiment variable dependent on ambient light conditions, as measured by the light sensor 131. In particular, the intensity of the maximum intensity level is reduced in lower light conditions, and is increased in conditions that are better lighted such that the subjectively perceived intensity of the visual indication provided by the internal indicator 171 is substantially consistent regardless of ambient light conditions.

If release of the button 115 by the user is detected, at operation 428, before the threshold duration is reached, then the camera controller 214 causes the camera 130 to capture video content. It will be appreciated that the image processing chip and/or the image sensor chip may not yet have booted up fully when the button is released, at operation 428, in which case there will be a lag between button release and the commencement of video capture. In this example embodiment, the internal indicator 171 is switched off when the button is released (at operation 428) before the threshold. In other example embodiments, the internal indicator 171 (or a different internal indication mechanism) provides a visual active video indication for the duration of video capture, the visual active video indication being visually distinct from the 50% intensity mode indication provided during button press. In one example, the active video indication may be by blinking of the internal indicator 171, e.g., at the lower power level.

If, however, it is determined at operation 420 that the button 115 has been pressed for longer than 600 ms., then the eyewear device 100 switches to a photo capture mode (represented by the sequence of operations branching off to the left hand side of operation 420 in FIG. 4). First, the internal indicator 171 is, in this example embodiment, switched off, at operation 437. Thus, the absence of illumination of the internal indicator 171 while the button is pressed serves as a mode indication that communicates to the wearer that the device 100 is in in the photo capture mode, in which button release will trigger photo capture. In other embodiments, photo mode indication may be performed in a different manner, e.g., comprising displaying a differently colored indication, changing intensity of internal illumination, blinking, or the like.

Accordingly, when it is detected, at operation 441, that the button has been released subsequent to expiry of the threshold duration, photo capture by the camera 130 is triggered, at operation 445, and the internal indicator 171 produces a substantially synchronous photo capture flash, at operation 451. As depicted schematically in FIG. 5, the button 115 is in the example instance released at about t=700 ms, with actual photo capture occurring at about t=800 ms. In this example embodiment, the photo capture flash has a consistent duration of about 200 ms, and is provided at an ambient-sensitive intensity level of 100%.

A benefit of the described techniques is that the user-provided trigger for visual media capture is in effect provided not by the instant of button press, but by the instant of button release. Although it is counterintuitive to associate a longer press with a shorter format of visual media (photo as compared to video), in which there is necessarily less tolerance for inaccuracies in the timing of image capture, lag or delay between button release and visual media capture will be significantly shorter for photo capture than for video capture. Some aspects of the disclosed techniques is thus based on the insight that user satisfaction is more likely to be adversely affected by initial lag or delay in photo capture than is the case for video capture. These techniques therefore promote effective operation of the eyewear device 100 in an always-on state, with photo or video capture being triggerable by a single-action input via the button 115, without adversely affecting battery performance and while minimizing user-experienced delay resulting from camera boot-up.

Example Machine and Hardware Components

The example electronic devices described above may incorporate various computer components or machine elements, at least some of which are configured for performing automated operations and/or for automatically providing various functionalities. These include, for example, automated image data processing and image capturing parameter adjustment, as described. The eyewear device 100 may thus provide an independent computer system. Instead, or in addition, the device 100 may form part of a distributed system including on ore more off-board processors and/or devices.

Figure 6:
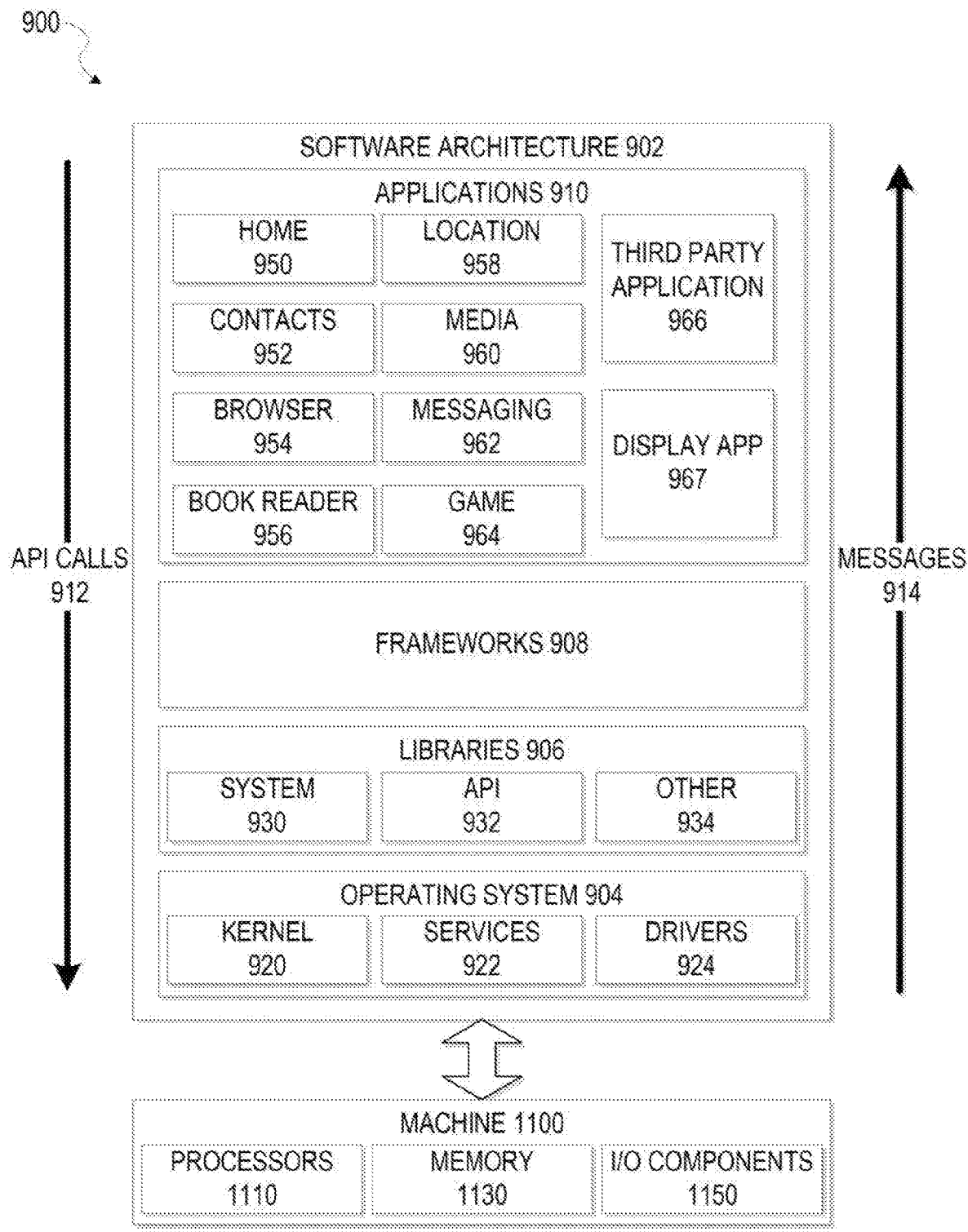
FIG. 6 is a block diagram illustrating an example of a software architecture that may be installed on a machine to provide functionalities according to the disclosed techniques, according to some example embodiments.

FIG. 6 is a block diagram 900 illustrating an architecture of software 902, which can be installed on any one or more of the devices described above. FIG. 6 is merely a non-limiting example of a software architecture, and it will be appreciated that many other architectures can be implemented to facilitate the functionality described herein. In various embodiments, the software 902 is implemented by hardware such as machine 1100 of FIG. 7 that includes processors 1110, memory 1130, and I/O components 1150. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device, server computer of a server system, or any other device described herein may operate using elements of software 902. Devices such as the camera controller 214 and other components of the portable electronic devices, as described earlier, may additionally be implemented using aspects of software 902.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers. BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the camera controller 214 of eyewear device 100, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3). Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C. Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a display application 967. Such an application 967 may interact with I/O components 1150 to establish various wireless connections with the described devices. Display application 967 may, for example, communicate with the camera controller 214 to automatically control display of visual media captured by the eyewear device 100.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 7:
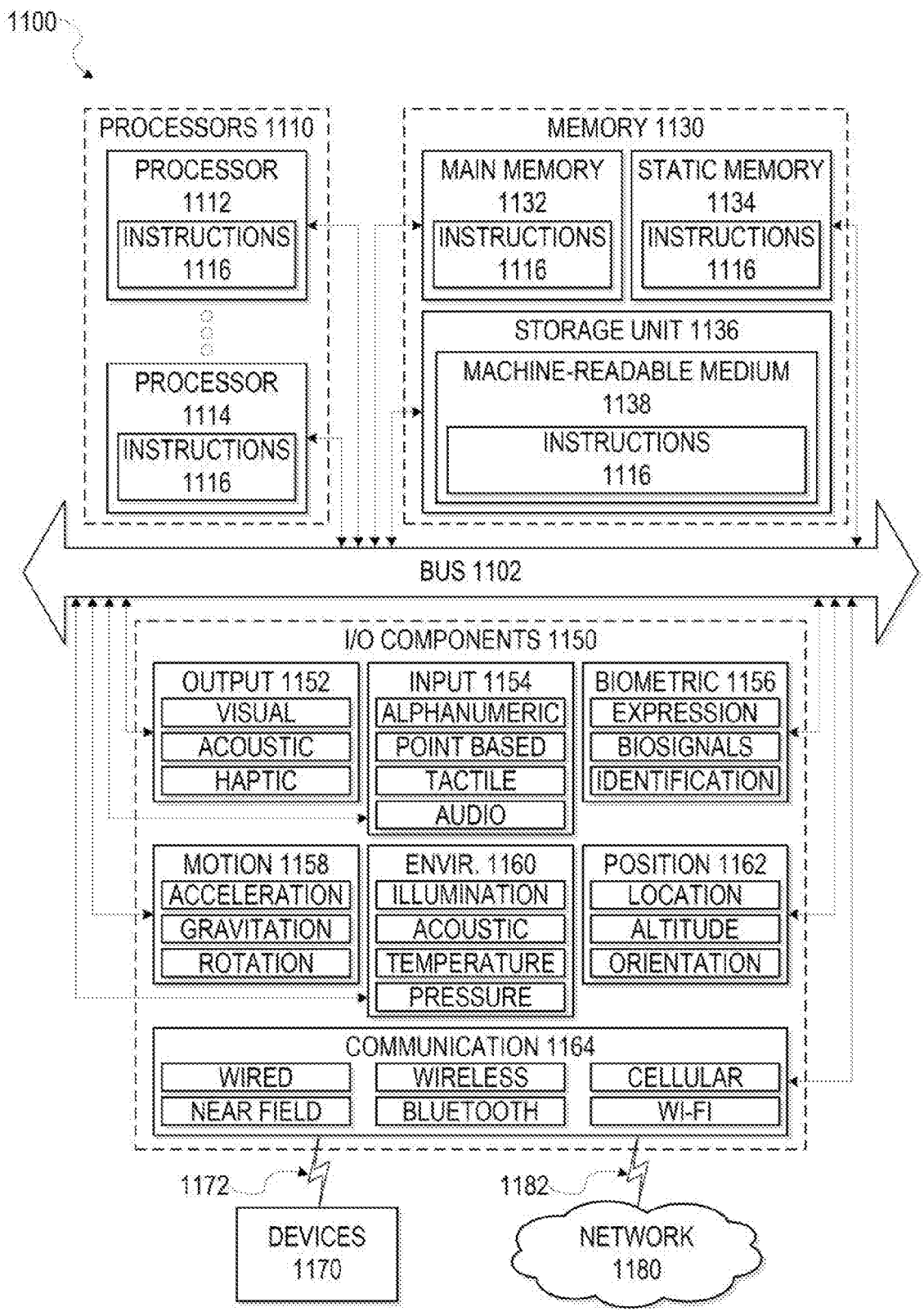
FIG. 7 is a diagrammatic representation of a machine in the form of a computer system within which a set of instructions may be executed for causing the machine to perform any one or more of the disclosed techniques, according to an example embodiment.

FIG. 7 is a block diagram illustrating components of a machine 1100, according to some embodiments, able to read instructions from a machine-readable medium (e.g., a machine-readable storage medium) and perform any one or more of the methodologies discussed herein. Specifically, FIG. 7 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1112 and a processor 1114 that may execute the instructions 1116. The term "processor" is intended to include multi-core processors that may comprise two or more independent processors (also referred to as "cores") that can execute instructions contemporaneously. Although FIG. 7 shows multiple processors 1110, the machine 1100 may include a single processor with a single core, a single processor with multiple cores (e.g., a multi-core processor), multiple processors with a single core, multiple processors with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 7. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components. Near Field Communication (NFC) components. BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code. Data Matrix, Dataglyph, MaxiCode. PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom such that structural and logical substitutions and changes may be made without departing from the scope of this disclosure. The Detailed Description, therefore, is not to be taken in a limiting sense, and the scope of selected embodiments is defined by the appended claims, along with the full range of equivalents to which such claims are entitled.

It will thus be seen that the foregoing description disclose a number of different example embodiments. A non-exhaustive numbered list of such embodiments is presented below in recapitulation of the disclosure. It is emphasized that the numbered example embodiments are non-exhaustive and that additional unlisted embodiments falling within the scope of the disclosure are contemplated.

Example 1: A device comprising:
a device body;
a camera carried by the device body;
an input mechanism provided on the device body to enable user control over operation of the camera, the input mechanism being disposable between an engaged condition and a disengaged condition; and
a camera controller incorporated in the device body and configured to perform operations comprising:
 identifying the length of a holding duration of a user input received via the input mechanism, the user input comprising continuous user-controlled disposal of the input mechanism to the engaged condition for the holding duration;
 if the holding duration is shorter than a predefined threshold duration, causing capture of video content by the camera; and
 if the holding duration exceeds the threshold duration, causing capture of photographic content by the camera.

Example 2: The device of example 1, wherein the predefined threshold duration is between 500 ms and 1000 ms.

Example 3: The device of example 1, wherein the predefined threshold duration is between 550 and 650 ms.

Example 4: The device of any one of examples 1-3, wherein the input mechanism is a button mechanism which, in the engaged condition, is pressed and, in the disengaged condition, is released, the user input comprising a press-and-hold operation in which the button mechanism is held pressed for the holding duration.

Example 5: The device of any one of examples 1-4, wherein the camera controller is further configured to perform operations comprising:
upon initiation of the user input, disposing the device in a video capture mode in which release of the input mechanism triggers video capture;
during the holding duration, while the holding duration is shorter than the threshold duration, maintaining the device in the video capture mode; and
during the holding duration, in response to the holding duration exceeding the threshold duration, switching the device to a photo capture mode in which release of the input mechanism triggers photo capture.

Example 6: The device of example 5, further comprising a mode indication mechanism configured to indicate to the user, during the holding interval, a current mode of the device selected from the video capture mode and the photo capture mode.

Example 7: The device of example 6, wherein the device is an eyewear device, the mode indication mechanism comprising an indicator light positioned on the device body to be visible to the user when the eyewear device is worn.

Example 8: The device of example 7, wherein the mode indication mechanism is configured such that the indicator light is illuminated in the video capture mode and is off in the photo capture mode, or vice versa.

Example 9: The device of example 7 or example 8, wherein the indicator light is illuminated in the video capture mode at a submaximal intensity level.

Example 10: The device of example 9, wherein the mode indication mechanism is further configured to provide a photo capture indication subsequent to release of the input mechanism, the photo capture indication comprising a photo capture flash provided by the indicator light, the photo capture flash having an intensity higher than the video capture mode indication.

Example 11: The device of example 10, wherein the photo capture flash has a duration of about 100 ms.

Example 12: The device of any one of examples 7-11, wherein the mode indication mechanism is configured such that intensity of illumination of the indicator light to indicate the current mode is variable depending on ambient lighting conditions.

Example 13: The device of any one of examples 1-12, wherein the device is in a wearable device with an onboard battery that powers operation of onboard electronic components of the device, and wherein the device is configured to function, while the battery is sufficiently charged, in an always-on condition in which image-capture is triggerable via the input mechanism, the device providing no functionality to power up or down responsive to user input.

Example 14: The device of example 13, wherein the camera controller and/or the camera are configured to enter a dormant mode, and automatically to boot up to an active mode responsive to user-disposal of the input mechanism to the engaged condition.

Example 15: The device of any one of examples 1-13, wherein the device is an eyewear device that comprises:

an eyewear body comprising an eyewear frame that defines one or more optical element holders configured to hold one or more optical elements in view of a user when the eyewear device is worn, the camera being housed by the eyewear body, and the input mechanism being provided on the eyewear body.

Example 16: An eyewear device that comprises:

an eyewear body comprising an eyewear frame that defines one or more optical element holders configured to hold one or more optical elements in view of a user when the eyewear device is worn;

a camera housed by the eyewear body;

an input mechanism provided on the eyewear body to receive user input to control operation of the camera, the input mechanism being disposable between an engaged condition and a disengaged condition; and a camera controller incorporated in the device body and configured to perform operations comprising:

identifying the length of a holding duration of a user input received via the input mechanism, the user input comprising continuous user-controlled disposal of the input mechanism to the engaged condition for the holding duration; and if the holding duration is shorter than the threshold duration, causing capture of video content by the camera; and if the holding duration exceeds the threshold duration, causing capture of photographic content by the camera.

Example 17: A method comprising:

at an eyewear device, receiving user input to control operation of a camera incorporated in the eyewear device, the user input comprising disposal of an input mechanism of the eyewear device to an engaged condition for a holding duration; and responsive to and conditional upon determining that the holding duration exceeds a predefined threshold duration, capturing photographic content by use of the camera.

Example 18: The method of example 17, further comprising, responsive to and conditional upon the holding duration failing to exceed the threshold duration, capturing video content by use of the camera.

Example 19: The method of example 18, wherein the predefined threshold duration is between 500 ms and 1000 ms.

Example 20: The method of example 18, wherein the predefined threshold duration is between 550 and 650 ms.

Example 21: The method of any one of examples 17-20, wherein the input mechanism is a single-action button mechanism which, in the engaged condition, is pressed and, in the disengaged condition, is released, the user input comprising a press-and-hold operation in which the button mechanism is held pressed for the holding duration.

Example 22: The method of any one of examples 17-21, further comprising:

upon initiation of the user input, disposing the device in a video capture mode in which release of the input mechanism triggers video capture;

during the holding duration, while the holding duration is shorter than the threshold duration, maintaining the device in the video capture mode; and during the holding duration, in response to the holding duration exceeding the threshold duration, switching the device to a photo capture mode in which release of the input mechanism triggers photo capture.

Example 23: The method of example 22, via a visual mode indication mechanism, indicating to the user, during the holding interval, a current mode of the device selected from the video capture mode and the photo capture mode.

Example 24: The method of example 23, wherein the device is an eyewear device, the mode indication mechanism comprising an indicator light positioned on the device body to be visible to the user when the eyewear device is worn.

Example 25: The method of example 24, wherein indicating the current mode of the device comprises illuminating the indicator light in the video capture mode and maintaining the indicator light in a non-illuminated state in the photo capture mode, or vice versa.

Example 26: The method of example 25, wherein the indicator light is illuminated in the video capture mode at a submaximal intensity level.

Example 27: The method of example 26, further comprising:

providing a photo capture indication subsequent to release of the input mechanism, the photo capture indication comprising a photo capture flash provided by the indicator light, the photo capture flash having an intensity higher than the video capture mode indication.

Example 28: The method of example 26 or 27, wherein the photo capture flash has a duration of about 100 ms.

Example 29: The method of any one of examples 24-28, wherein the intensity of illumination of the indicator light to indicate the current mode is variable depending on ambient lighting conditions.

Example 30: The method of any one of examples 17-29, wherein the device is in a wearable device with an onboard battery that powers operation of onboard electronic components of the device, and wherein the device is configured to function, while the battery is sufficiently charged, in an always-on condition in which image-capture is triggerable via the input mechanism, the device providing no functionality to power up or down responsive to user input.

Example 31: The method of example 30, further comprising maintaining the camera controller and/or the camera in a dormant mode, and automatically booting up the camera controller and/or the camera to an active mode responsive to user-disposal of the input mechanism to the engaged condition.

Example 32: A computer readable storage medium having stored thereon instructions for causing a machine, when executing the instructions, to perform operations comprising the method of any one of examples 16-31.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed, is:

1. An eyewear device comprising:
   an eyewear body;
   a camera carried by the eyewear body;
   a mode indication mechanism comprising an indicator light positioned on the eyewear body to be visible to a user wearing the eyewear device;
   an input mechanism provided on the eyewear body to enable user control over operation of the camera, the input mechanism being disposable between an engaged condition and a disengaged condition; and
   a camera controller incorporated in the eyewear body and configured to perform operations comprising:
      identifying the length of a holding duration relative to a predefined threshold duration of a user input received via the input mechanism, the user input comprising continuous user-controlled disposal of the input mechanism to the engaged condition for the holding duration;
      upon initiation of the user input, disposing the eyewear device in a video capture mode in which release of the input mechanism triggers video capture;
      during the holding duration, while the holding duration is shorter than the threshold duration, maintaining the eyewear device in the video capture mode and displaying via the mode indicator mechanism a video capture mode indication:
      if the holding duration is shorter than the threshold duration, causing capture of video content by the camera;
      during the holding duration, in response to the holding duration exceeding the threshold duration, switching the eyewear device to a photo capture mode in which release of the input mechanism triggers photo capture; and
      if the holding duration exceeds the threshold duration, responsive to release of the input mechanism, causing capture of photographic content by the camera and causing the indicator light to provide a photo capture indication synchronous to photographic content capture, the photo capture indication comprising a photo capture flash having an intensity higher than the video capture mode indication.

2. The device of claim 1, wherein the input mechanism is a button mechanism which, in the engaged condition, is pressed and, in the disengaged condition, is released, the user input comprising a press-and-hold operation in which the button mechanism is held pressed for the holding duration.

3. The device of claim 1, wherein the mode indication mechanism is configured such that the indicator light is illuminated in the video capture mode and is off in the photo capture mode.

4. The device of claim 1, wherein the mode indication mechanism is configured such that intensity of illumination of the indicator light to indicate a current mode is variable depending on ambient lighting conditions.

5. The device of claim 4, wherein the camera controller and/or the camera are configured to enter a dormant mode, and automatically to boot up to an active mode responsive to user-disposal of the input mechanism to the engaged condition.

6. The device of claim 1, wherein the eyewear body comprises an eyewear frame that defines one or more optical element holders configured to hold one or more optical elements in view of a user when the eyewear device is worn, the camera, the input mechanism, and the camera controller being incorporated into the eyewear frame.

7. A method comprising:
   at an eyewear device, receiving user input to control operation of a camera incorporated in the eyewear device, the user input comprising disposal of an input mechanism of the eyewear device to an engaged condition for a holding duration;
   monitoring the length of the holding duration relative to a predefined threshold duration;
   upon initiation of the user input, disposing the eyewear device in a video capture mode in which release of the input mechanism triggers video capture;
   during the holding duration, while the holding duration is shorter than the threshold duration, maintaining the eyewear device in the video capture mode and displaying a video capture mode indication via a mode indication mechanism comprising an indicator light positioned on a body of the eyewear device to be visible to a user wearing the eyewear device;
   if the holding duration is shorter than the threshold duration, causing capture of video content by the camera;
   during the holding duration, in response to the holding duration exceeding the threshold duration, switching the eyewear device to a photo capture mode in which release of the input mechanism triggers photo capture; and
   if the holding duration exceeds threshold duration, responsive to release of the input mechanism, causing capture of photographic content by use of the camera and causing the indicator light to produce a photo capture indication synchronous to photographic content capture, the photo capture indication comprising a photo capture flash having an intensity higher than the video capture mode indication.

8. The method of claim 7, wherein indicating a current mode of the eyewear device comprises illuminating the indicator light in the video capture mode and maintaining the indicator light in a non-illuminated state in the photo capture mode.

9. The method of claim 7, wherein the eyewear device has an onboard battery that powers operation of onboard electronic components of the eyewear device, and wherein the eyewear device is configured to function, while the battery is sufficiently charged, in an always-on condition in which image-capture is triggerable via the input mechanism, the device providing no functionality to power down responsive to user input, and the method further comprising:

maintaining the camera and/or a camera controller controlling the camera in a dormant mode, and automatically booting up the camera and/or the camera controller to an active mode responsive to user-disposal of the input mechanism to the engaged condition.

10. A non-transitory computer-readable storage medium, the computer-readable storage medium having stored thereon instructions that when executed by a computer, cause the computer to perform operations comprising:

at an eyewear device, receiving user input to control operation of a camera incorporated in the eyewear device, the user input comprising disposal of an input mechanism of the eyewear device to an engaged condition for a holding duration;

monitoring the length of the holding duration relative to a predefined threshold duration;

upon initiation of the user input, disposing the eyewear device in a video capture mode in which release of the input mechanism triggers video capture;

during the holding duration, while the holding duration is shorter than the threshold duration, maintaining the eyewear device in the video capture mode and displaying a video capture mode indication via a mode indication mechanism comprising an indicator light positioned on a body of the eyewear device to be visible to a user wearing the eyewear device;

if the holding duration is shorter than the threshold duration, causing capture of video content by the camera;

during the holding duration, in response to the holding duration exceeding the threshold duration, switching the eyewear device to a photo capture mode in which release of the input mechanism triggers photo capture; and if the holding duration exceeds threshold duration, responsive to release of the input mechanism, causing capture of photographic content by use of the camera and causing the indicator light to produce a photo capture indication synchronous to photographic content capture, the photo capture indication comprising a photo capture flash having an intensity higher than the video capture mode indication.

* * * * *

UNITED STATES PATENT AND TRADEMARK OFFICE
CERTIFICATE OF CORRECTION

PATENT NO. : 11,006,043 B1
APPLICATION NO. : 16/374718
DATED : May 11, 2021
INVENTOR(S) : Hanover et al.

Page 1 of 1

It is certified that error appears in the above-identified patent and that said Letters Patent is hereby corrected as shown below:

In the Claims

In Column 19, Line 62, in Claim 1, delete "indication:" and insert --indication;-- therefor Signed and Sealed this
Fifth Day of October, 2021

Drew Hirshfeld
*Performing the Functions and Duties of the
Under Secretary of Commerce for Intellectual Property and
Director of the United States Patent and Trademark Office*